United States Patent [19]

Nagafusa

[11] Patent Number: 4,907,084
[45] Date of Patent: Mar. 6, 1990

[54] IMAGE READING UNIT WITH BLACK LEVEL CONTROL

[75] Inventor: Yoshiyuki Nagafusa, Tokyo, Japan

[73] Assignee: Asahi Kogaku Kogyo Kabushiki Kaisha, Tokyo, Japan

[21] Appl. No.: 237,210

[22] Filed: Aug. 29, 1988

[30] Foreign Application Priority Data

Aug. 28, 1987 [JP] Japan .......................... 62-131094[U]

[51] Int. Cl.⁴ .............................................. H04N 5/16
[52] U.S. Cl. ................................. 358/171; 358/213.16
[58] Field of Search ...................... 358/213.16, 213.15, 358/213.26, 172, 171, 161, 169, 168; 219/501; 307/318

[56] References Cited

U.S. PATENT DOCUMENTS

| | | | |
|---|---|---|---|
| 3,947,631 | 3/1976 | Rhee et al. ........................... | 358/171 |
| 4,404,462 | 9/1983 | Murray ................................. | 219/501 |
| 4,484,223 | 11/1984 | Tsunekawa ..................... | 358/213.16 |
| 4,689,679 | 8/1987 | Hinn .................................... | 358/171 |
| 4,704,633 | 11/1987 | Matsumoto ......................... | 358/169 |
| 4,786,969 | 11/1988 | Shouji et al. ........................ | 358/171 |

Primary Examiner—Jin F. Ng
Assistant Examiner—Stephen Brinich
Attorney, Agent, or Firm—Sughrue, Mion, Zinn, Macpeak & Seas

[57] ABSTRACT

An image scanner for reading images from an original document or the like less susceptible to induced noise. An image output signal from a CCD sensor is sampled and held and the black level of the resulting signal is adjusted to a desired value. The black-level-adjusted signal is converted to digital form and transmitted to an external utilization unit after its timing has been properly adjusted.

6 Claims, 3 Drawing Sheets

IMAGE READING UNIT WITH BLACK LEVEL CONTROL

BACKGROUND OF THE INVENTION

The present invention relates to an image reading unit for use in an image scanner for reading images, and more particularly to an image reading unit which outputs an image reading signal in the form of a digital signal.

In general, in an image scanner for optically scanning an original document to convert the image of the original into an electrical signal, a main scanning operation in one direction is carried out with an image reading unit having light-detecting elements arranged in a line, while the original or the image reading unit is moved in a direction perpendicular to the main scanning direction to carry out auxiliary scanning, whereby electrical signals are outputted in correspondence to the quantities of light applied to the light-detecting elements to read the image.

In the image reading unit of the image scanner, a light source, such as a fluorescent lamp, for illuminating the surface of the original, an optical lens group acting as a reducing optical system for forming the image of the original irradiated by the light source on the light-detecting element surface, and light-detecting elements for converting the optical image into electrical signals are arranged in that order.

A charge-coupled element (CCD) capable of providing a large output voltage and requiring only a simple read control operation has heretofore been extensively utilized for the light detecting elements in such a scanner. The image signal produced by a CCD sensor is in the form of an analog signal.

The analog signal has typically been transmitted from the image reading unit to the image scanner body through a signal cable without modification. In the image scanner body, the analog signal is either applied to an external device directly or applied to an image processing device or the like after being subjected to digital processing such as analog-to-digital conversion.

In the above-described method of transmitting the image signal in the form of an analog signal from the image reading unit to the image scanner body, however, the image signal is liable to be affected by external noise while passing through the signal cable extending between the image reading unit and the image scanner body. The image signal is thereby lowered in linearity with respect to the original by such noise, and at worst the image signal can be buried in the noise.

The noise is present due to the fact that the signal cable is laid about in the image scanner body. Furthermore, in the case where a CCD sensor is employed as the light-detecting element array, a clock signal for operating the CCD sensor is applied to the CCD sensor from the image scanner body. Since the wire carrying the clock signal and the wire carrying the analog image signal are often laid adjacent to each other in the signal cable, the image signal is greatlY affected by the induced clock noise.

SUMMARY OF THE INVENTION

In view of the foregoing, the invention provides an image reading unit in which the output image signal is converted into a digital signal stable against noise, which is applied to an image scanner body or the like.

More specifically, the invention provides an image reading unit adapted to output in synchronization with a predetermined clock signal an image signal corresponding to the quantity of light reflected from the surface of an original in an image scanner for reading images, which, according to the invention, comprises: a light-detecting element for outputting an image signal; means for temporarily holding the image signal; level setting means for setting a black level to a desired value; arithmetic means for executing an arithmetic operation using the black level set by the level setting means to change the black level of the image signal; signal converting means for converting the image signal into a digital signal; and timing adjusting means for causing the control timing of the light-detecting element and signal converting means to be synchronous with the timing of the clock signal, the light-detecting element, temporary holding means, level setting means, arithmetic means, signal converting means, and timing adjusting means being built in a single unit.

In the image reading unit thus constructed, the black level of the output image signal can be set to a desired value, and can be converted into a digital image signal stable against external noise, which is supplied to the image scanner body.

DESCRIPTION OF THE PREFERRED EMBODIMENTS

A preferred embodiment of the invention will be described with reference to the accompanying drawings.

Figure 1:
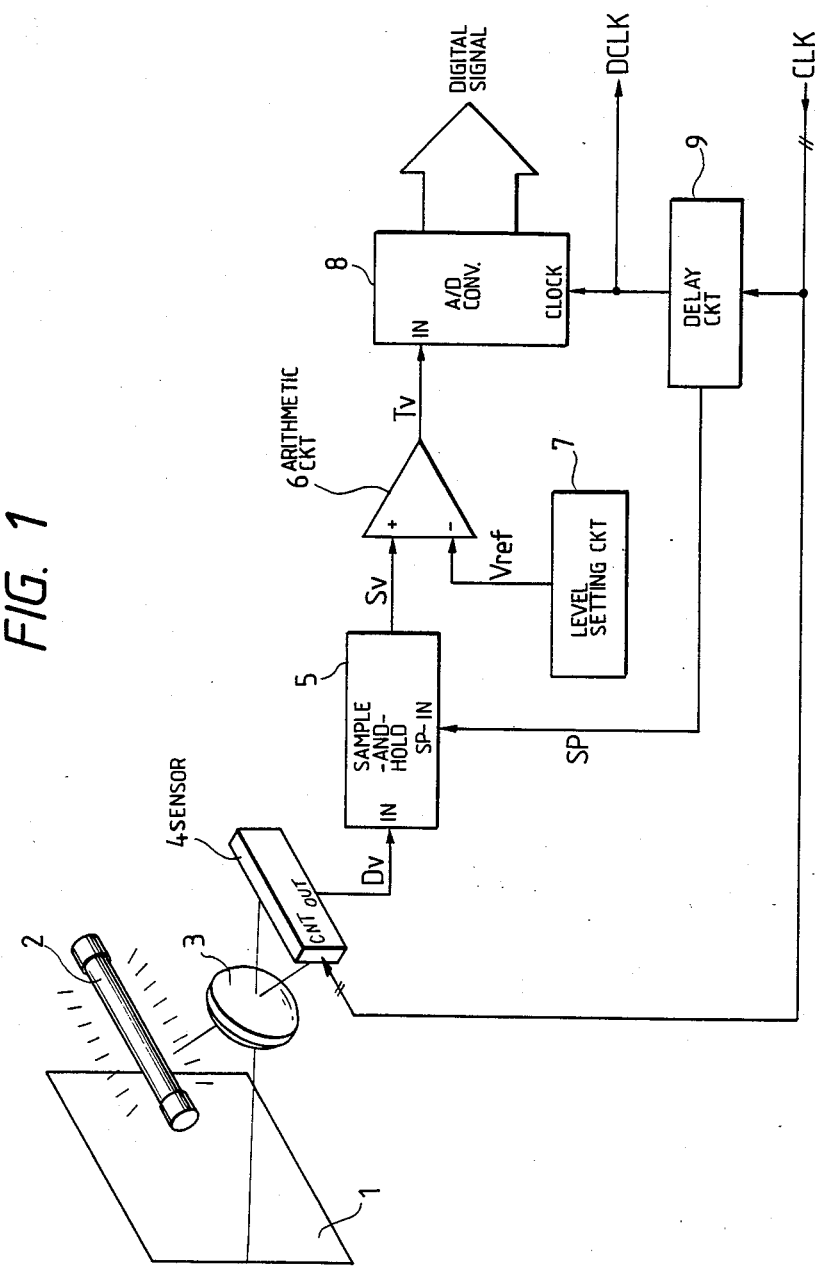
FIG. 1 is a block diagram showing an example of an image reading unit according to the invention.
Figure 4:
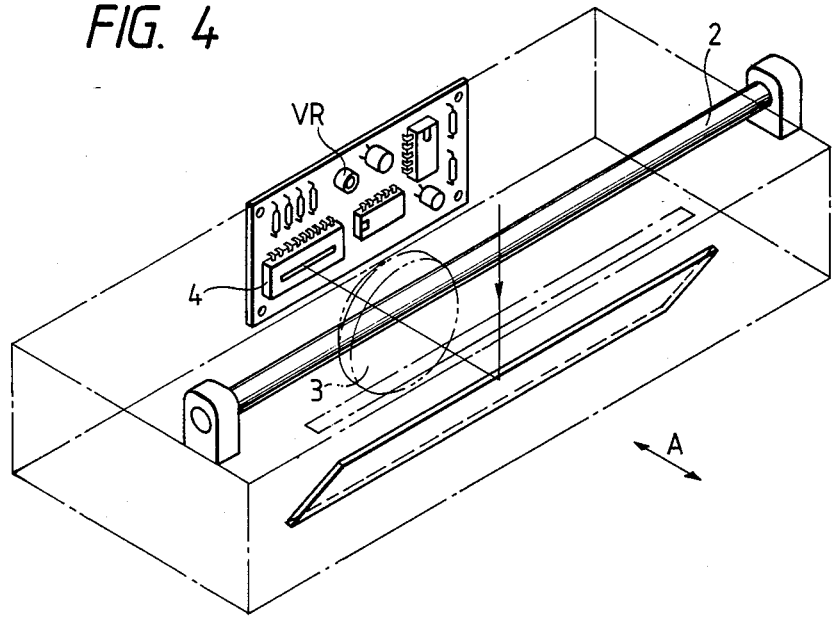
FIG. 4 is a perspective view showing the general construction of the image reading unit in FIGS. 1 and 2.

FIG. 1 is a block diagram showing the general arrangement of an image reading unit in an image scanner constructed according to the present invention. FIG. 4 is a perspective view showing the construction of an image reading unit in FIG. 1.

The image reading unit according to the invention includes a light source, namely, a fluorescent lamp 2; a light-detecting element, namely, a CCD sensor 4; a reducing optical system, namely, an optical lens group 3 for forming the image of an original irradiated by the fluorescent lamp 2 on the light receiving surface of the CCD sensor 4, the components 2, 3 and 4 being essential components of a conventional image reading unit; and a built-in image processing circuit which includes: temporary holding means, namely, a sample-and-hold circuit 5; arithmetic means, namely, an arithmetic circuit 6; level setting means, namely, a level setting circuit 7; signal converting means, namely, an A/D (analog-to-digital) converter 8; and timing adjusting means, namely, a delay circuit 9.

The surface of the original 1 is illuminated by the fluorescent lamp 2, and its image is formed on the CCD sensor 4 by the optical lens group 3.

A plurality of control clock signals CLK provided by a control section (not shown) in the image scanner body are applied to the control terminal CNT of the CCD sensor, whereby, in correspondence to image data generated and stored using the irradiating light beam of the fluorescent lamp 2, signal charges are successively transferred to the output stage of the CCD sensor 4 where they are converted into signal voltages. The signal voltages are applied, as a signal Dv (FIG. 1), to the sample-and-hold circuit 5 through the signal output terminal OUT of the sensor 4.

In the sample-and-hold circuit 5, the signal Dv applied to the input terminal IN is held for a period of time equal to the sum of a period of time required for the conversion operation of the A/D converter 8 and a time margin. The resulting sampled signal is then applied, as a signal Sv, to the arithmetic circuit 6. In this operation, the sampling time of the signal Dv is controlled by a sampling pulse SP which is applied to the sampling pulse input terminal SP-IN by the delay circuit 9 (described below).

In the arithmetic circuit 6, an image signal black level voltage Vref, determined by the level setting circuit 7, and the output signal Sv of the sample-and-hold circuit 5 are subjected to an arithmetic operation to subtract the black level voltage Vref from the signal $S_v$, and the result of this arithmetic operation is applied, as a signal Tv, to the A/D converter 8.

In this case, the black level voltage of the output signal Tv of the arithmetic circuit 6 is obtained by shifting the black level voltage of the signal Sv by the black level voltage Vref. Therefore, the black level voltage of the signal Tv can be set to a desired value by changing the black level voltage Vref with the level setting circuit 7.

In the A/D converter, the output signal Tv from the arithmetic circuit 6 applied to the signal input terminal IN is converted into a digital signal with the timing of a clock signal DCLK, which is applied to the clock input terminal CLOCK by the delay circuit 9.

The reason why the timing of the clock signal DCLK is employed for timing of analog-to-digital conversion is a follows: The input signal Tv to the A/D converter 8 is delayed because of the signal charge transfer time in the CCD sensor 4 and by the sample-and-hold circuit 5 and the arithmetic circuit 6. Therefore, if the conversion is carried out with the timing of the control clock signal CLK of the CCD sensor 4, since the aperture time of the A/D converter 8 is not taken into account, the conversion is not in synchronization with the delayed signal $T_v$, and accordingly it becomes impossible to correctly achieve signal conversion.

Furthermore, if an external image processing device, which receives the output of the A/D converter 8 through an image output buffer, is operated with the timing of the signal CLK, the reading timing will be incorrect, as a result of which is becomes difficult for the device to stably receive or transmit the signal.

Therefore, the delay circuit 9 delays the signal CLK outputted by the control section (not shown) in the image scanner body in such a manner that the delay time of the signal Tv and the aperture time of the A/D converter 8 are corrected to provide the clock signal DCLK. Thus, the A/D converter 8 is operated with the timing of the signal DCLK.

The delay circuit 9 further forms the sampling pulse SP in correspondence to the sampling timing of the sample-and-hold circuit 5, in addition to the signal DCLK. The sampling pulse SP is applied to the sampling pulse input terminal SP-IN of the sample-and-hold circuit 5.

In the image reading unit thus constructed, the output image signal of the CCD sensor 4 is converted into a digital signal by the A/D converter 8 with the timing of the clock signal DCLK. The digital signal is applied through a signal cable to an image output buffer (not shown) in the image scanner body.

In the image scanner body, the digital signal applied to the image output buffer (not shown) by the A/D converter 8 is supplied to output devices such as an external printer and a display unit under the control of the control section (not shown).

In this case, the control section of the image scanner body carries out the required control operations with the timing of the signal DCLK provided by the delay circuit 9.

The image reading unit shown in FIG. 4 is disposed below the horizontal glass plate on which the original is placed in the image scanner body. In the image reading unit, the surface of the original is irradiated by the fluorescent lamp 2 provided in the upper part of the unit, and the light reflected from the original is applied through a slit and the optical lens group 3, which is a reducing optical system, to the CCD sensor 4, so that the image of the original is formed on the light receiving surface of the sensor 4. At the same time, the unit itself is moved in the auxiliary scanning direction (as indicated by an arrow A in FIG. 4) perpendicular to the main scanning direction.

Figure 2:
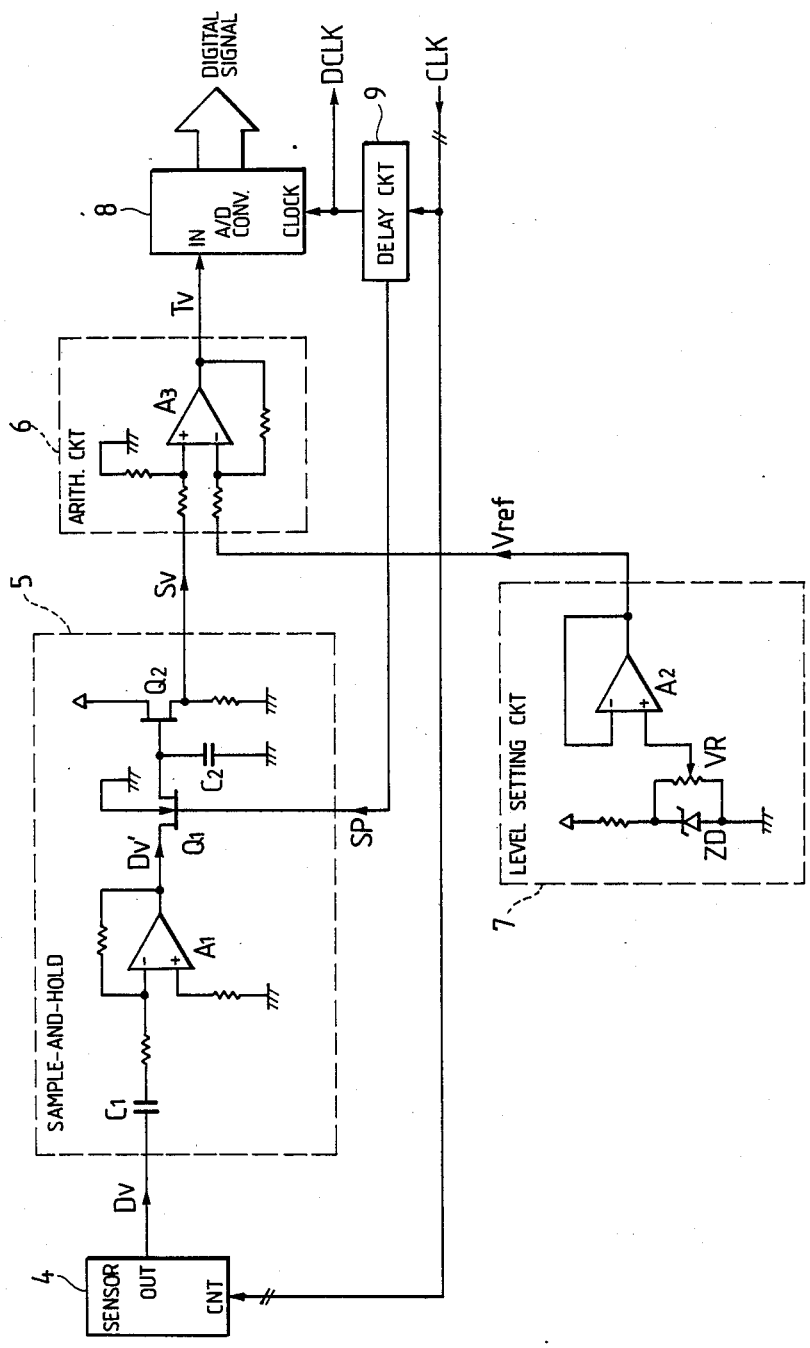
FIG. 2 is a block diagram showing a part of FIG. 1 in more detail.
Figure 3:
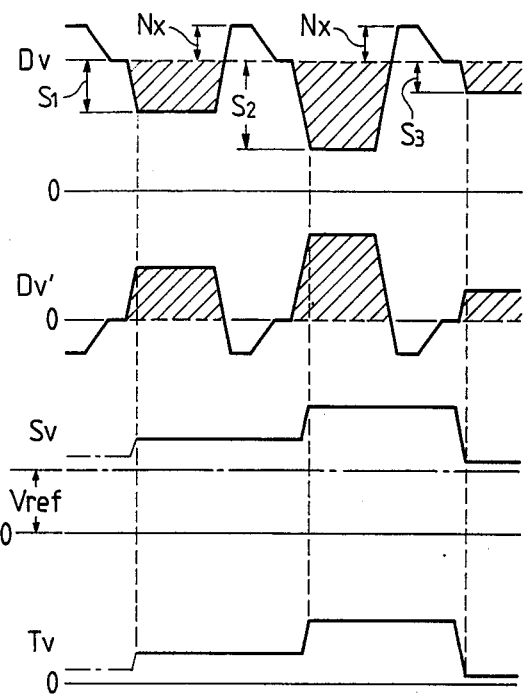
FIG. 3 is a timing chart showing waveforms of signals at various points in the image reading unit in FIGS. 1 and 2.

FIG. 2 is a block diagram showing a part of FIG. 1 in more detail. FIG. 3 is a timing chart showing the waveforms of signals at various parts of the image reading unit in FIGS. 1 and 2.

The output signal Dv of the CCD sensor 4, as shown in FIG. 3, has an offset bias voltage of several volts, from which negative image data optical signals (signal components $S_1$, $S_2$, $S_3$, . . . in FIG. 3) are produced according to optical intensities. Furthermore, in the signal Dv, the inductive components (Nx in FIG. 3) of the control clock signal CLK of the CCD sensor 4 extend from the offset bias voltage in the positive direction. The inductive components are removed by operation of the sample-and-hold circuit 5 shown in FIG. 2 as follows:

When the signal Dv is applied to the sample-and-hold circuit 5, its offset components are removed by means of a coupling capacitor $C_1$ which is AC coupled to the signal Dv. The signal Dv thus processed is applied to an inverting amplifier $A_1$, where it is subjected to inversion and outputted as a signal Dv'.

An FET switch $Q_1$ is turned on and off by the sampling pulse SP. When the FET switch $Q_1$ is turned on, the optical signal components $S_1$, $S_2$, $S_3$, . . . of the signal Dv' are charged in a signal holding capacitor $C_2$. The timing of the sample pulse SP is adjusted by the delay circuit 9 so as to be synchronous with the output timing of the optical signal components $S_1$, $S_2$, $S_3$, . . . . . . , whereby the FET switch $Q_1$ is turned off with output timing of the inductive components Nx of the signal CLK to remove the inductive components Nx.

The optical signal components $S_1$, $S_2$, $S_3$, . . . held by the capacitor $C_2$ are applied, as a signal Sv, to the arithmetic circuit 6 by an FET $Q_2$ connected in a source-follower circuit for impedance conversion.

A CCD sensor having in a package the sample-and-hold circuit 5, except for the FET $Q_2$ forming the source follower circuit for impedance conversion, is available on the market. If such a CCD sensor is used, the printed circuit board shown in FIG. 4 can be reduced in size, and therefore the image reading unit can be made more compact.

Further, in the level setting circuit 7, as shown in FIG. 2, a Zener diode ZD is connected to the power source side of a variable resistor VR which divides the supply voltage, thereby to stabilize the output voltage of the variable resistor VR. The resulting output voltage is applied, as the image signal black level voltage Vref, to the arithmetic circuit by a voltage follower including an operational amplifier $A_2$.

Thus, the black level voltage Vref can be set to a desired value by controlling the variable resistor VR.

The black level voltage Vref together with the signal Sv is shown in FIG. 3. The variable resistor VR is shown in FIG. 4, which is a perspective view of the image reading unit.

The arithmetic circuit 6, as described above, subtracts the black level voltage Vref set by the level setting circuit 7 from the output signal Sv of the sample-and-hold circuit 5. The arithmetic circuit 6 includes a subtraction circuit, inclusive of an operational amplifier $A_3$ as shown in FIG. 2, which subtracts the black level voltage Vref from the signal Sv to provide an output signal Tv which is applied to the A/D converter 8.

The zero level of the signal Tv can be set to any arbitrary level of the signal Sv. Therefore, the optical signal components $S_1$, $S_2$, $S_3$, ..., which are to be processed at the rear stage, can be set at a desired level.

The signal Tv, the black level of which has been set to a desired value, is converted into a digital signal by the A/D converter 8 and applied to the image scanner body.

As described above, in the conventional image scanner, the analog image signal of the image reading unit is conveyed to the image scanner body through a signal cable, where it is affected by external noise, and is converted into a digital signal on a different printed circuit board in the image scanner body. On the other hand, in the image reading unit of the invention, as shown in FIG. 4, the analog image signal is converted into a digital signal on the printed circuit board in the image reading unit and is not led about in the image scanner body through a signal cable; that is, the effect of external noise on the image signal is eliminated with the use of the invention.

The signals transmitted between the image scanner body and the image reading unit are the control clock signal CLK applied to the image reading unit by the image scanner body, the digital image signal applied to the image scanner body by the image reading unit, and the control signal DCLK. The image signal is converted into a digital signal which is stable against noise. Therefore, the image signal is not affected by induced noise due to the control clock signal CLK and the signal DCLK.

In the above-described embodiment, a fluorescent lamp is employed as the light source for illuminating the original. However, the invention is not limited thereto or thereby. If the CCD sensor has a sufficiently high sensitivity, a light-emitting element such as a LED array may be employed.

As described above, according to the invention, the image signal is transferred, as a digital signal stable against noise, to the image scanner body from the image reading unit. As a result, the image signal is not affected by induced noise from the clock signal or the like while passing through the signal cable; that is, the image data can be transmitted with high accuracy.

Furthermore, in accordance with the invention, because the black level voltage can be set to a desired value, the output digital signal can be provided with an image signal zero level set to an arbitrary value.

What is claimed is:

1. In an image scanner for reading images, an image reading unit adapted to output in synchronization with a predetermined clock signal an image signal corresponding to a quantity of light reflected from the surface of an original document, comprising:
    a light-detecting element for outputting an image signal;
    means for temporarily holding said image signal;
    level setting means for setting a black level to a desired value;
    arithmetic means for executing an arithmetic operation using said black level set by said level setting means to change the black level of said held image signal;
    signal converting means for converting said image signal into a digital signal which is used as said output image signal; and
    timing adjusting means for causing the control timing of said light-detecting element and signal converting means to be synchronous with the timing of said clock signal, said light-detecting element, temporary holding means, level setting means, arithmetic means, signal converting means, and timing adjusting means being provided in said unit.

2. The image scanner of claim 1, wherein said level setting means comprises means for supplying an adjustable reference voltage.

3. The image scanner of claim 2, wherein said means for supplying said adjustable reference voltage comprises: a Zener diode for supplying a stable fixed voltage, a variable resistor having end terminals connected to respective terminals of said zener diode, and an operational amplifier having an input terminal coupled to a wiper contact terminal of said variable resistor.

4. The image scanner of claim 1, wherein said temporary holding means comprises means for inverting said image signal and removing components thereof which correspond to said clock signal.

5. The image scanner of claim 1, wherein said temporary holding means holds said image signal for a period of time which corresponds to the sum of a period of time required for said signal converting means to convert said image signal into a digital signal and a predetermined time period.

6. The image scanner of claim 1, wherein said light-detecting element, temporary holding means, level setting means, arithmetic means, signal converting means, and timing adjusting means are all contained on the same printed circuit board.

* * * * *